(12) United States Patent
Gokturk et al.

(10) Patent No.: US 9,303,118 B2
(45) Date of Patent: Apr. 5, 2016

(54) POLYGLYCOLIC ACID AND COPOLYMERS THEREOF FROM C1 FEEDSTOCKS

(71) Applicant: UNIVERSITY OF FLORIDA RESEARCH FOUNDATION, INC., Gainesville, FL (US)

(72) Inventors: Ersen Gokturk, Gainesville, FL (US); Alexander G. Pemba, Gainesville, FL (US); Stephen A. Miller, Gainesville, FL (US)

(73) Assignee: UNIVERSITY OF FLORIDA RESEARCH FOUNDATION, INC., Gainseville, FL (US)

( * ) Notice: Subject to any disclaimer, the term of this patent is extended or adjusted under 35 U.S.C. 154(b) by 0 days.

(21) Appl. No.: 14/383,681

(22) PCT Filed: Mar. 8, 2013

(86) PCT No.: PCT/US2013/029859
§ 371 (c)(1),
(2) Date: Sep. 8, 2014

(87) PCT Pub. No.: WO2013/134635
PCT Pub. Date: Sep. 12, 2013

(65) Prior Publication Data
US 2015/0025218 A1 Jan. 22, 2015

Related U.S. Application Data

(60) Provisional application No. 61/608,196, filed on Mar. 8, 2012.

(51) Int. Cl.
| | |
|---|---|
| C08G 59/00 | (2006.01) |
| C08G 63/87 | (2006.01) |
| C08G 63/06 | (2006.01) |
| C08G 63/66 | (2006.01) |
| C08G 63/664 | (2006.01) |
| C08G 63/78 | (2006.01) |
| C08G 67/02 | (2006.01) |
| C08G 63/81 | (2006.01) |

(52) U.S. Cl.
CPC .............. *C08G 63/87* (2013.01); *C08G 63/06* (2013.01); *C08G 63/66* (2013.01); *C08G 63/664* (2013.01); *C08G 63/78* (2013.01); *C08G 63/81* (2013.01); *C08G 67/02* (2013.01)

(58) Field of Classification Search
CPC ................................. C08G 64/34; C02F 1/54
USPC .................................... 560/185, 187; 562/579
See application file for complete search history.

(56) References Cited

U.S. PATENT DOCUMENTS

| | | | |
|---|---|---|---|
| 3,383,364 A | 5/1968 | Nelson et al. | |
| 3,673,156 A | 6/1972 | Cevidalli et al. | |
| 4,128,575 A * | 12/1978 | Leupold et al. | ............... 562/579 |
| 4,824,997 A | 4/1989 | MacFarlane et al. | |
| 6,376,723 B2 | 4/2002 | Drent et al. | |
| 6,730,772 B2 | 5/2004 | Shastri | |
| 2001/0039364 A1* | 11/2001 | Drent et al. | ................... 568/457 |

FOREIGN PATENT DOCUMENTS

| | | |
|---|---|---|
| EP | 0450777 A2 | 10/1991 |
| GB | 2169609 A | 7/1986 |

OTHER PUBLICATIONS

Feng et al. Biodegradable Block Copolymers with Polyethylene Oxide and Polyglycolic Acid Value Blocks, Journal of Applied Polymer Science, 2002, vol. 86, pp. 2916-2919.*
Modena, M. et al., "Carbon Monoxide—Formaldehyde Copolymers," *Polymer Letters*, pp. 567-570, 1963, vol. 1.
Ragazzini, M. et al., "Preparation and Structure of Some Carbon Monoxide—Formaldehyde Copolymers," *Journal of Polymer Science: Part A*, 1964, pp. 5203-5212, vol. 2.
Feng, Y. et al., "Biodegradable Block Copolymers with Poly(ethyleneoxide) and Poly(glycolic acid-valine) Blocks," *Journal of Applied Polymer Science*, 2002, pp. 2916-2919, vol. 86.
Singh, V. et al., "Structure-Processing-Property Relationship of Poly(Glycolic Acid) for Drug Delivery Systems 1: Synthesis and Catalysis," *International Journal of Polymer Science*, 2010, pp. 1-23, vol. 2010, Article ID 652719.

* cited by examiner

*Primary Examiner* — Terressa Boykin
(74) *Attorney, Agent, or Firm* — Saliwanchik, Lloyd & Eisenschenk

(57) ABSTRACT

A method of preparing a poly(glycolic acid) (PGA) from the C1 feedstocks carbon monoxide and formaldehyde or its equivalent. By controlling the comonomer feed ratios and the polymerization temperatures, high quality PGA can be prepared. The method is extended to copolymers of PGA where alkylene oxides or cyclic ether comonomers are included into the polymerization mixture with the C1 monomers to yield polyester-ether thermoplastics.

15 Claims, 5 Drawing Sheets

(a) commercial polyglycolic acid (PGA)

(b) PGA from formaldehyde and CO

POLYGLYCOLIC ACID AND COPOLYMERS THEREOF FROM C1 FEEDSTOCKS

CROSS-REFERENCE TO RELATED APPLICATIONS

This application is the U.S. national stage of International Patent Application No. PCT/US2013/029859, filed Mar. 8. 2013, which claims the benefit of U.S. Provisional Application Ser. No. 61/608,196, filed Mar. 8, 2012, the disclosures of which are incorporated by reference herein in their entirety, including any figures, tables, or drawings.

The subject invention was made with government support under the National Science Foundation, Contract No. 0848236. The government has certain rights to this invention.

BACKGROUND OF INVENTION

The development of new polymeric materials from renewable resources is gaining considerable attention. Biorenewability is directed toward a sustainable raw material supply where the raw material is renewed from plants or other biological matter. Biorenewable polymers are pursued as environmentally friendly replacements for commodity plastics from petrochemical starting materials. Thermoplastics constitute more than 65% of all global polymer demand and many have the possibility to be recycled by melt-processing. Biorenewable thermoplastics are potentially recyclable, which is advantageous for consumer packaging and other high volume needs.

Although organic polymers from nature have been used for centuries, they are generally not thermoplastic and cannot be processed in the molten state. The first true thermoplastic, celluloid, was developed in the mid-1800s and was created by nitrating cellulose and adding an appropriate softener. A number of other modified natural polymers, such as cellulose acetate and rayon, have enjoyed commercial success. A very recent addition is Plastarch Material (PSM), which is made from modified cornstarch (>80%) and biodegradable additives. Another modern thermoplastic is named ComZein, which is derived from corn protein. These modified natural polymers have various drawbacks and generally do not enjoy the full processing characteristics of petroleum-based synthetic polymers. The goal remains to use low cost readily available starting materials from biorenewable resources to produce thermoplastic polymers that are competitive with current commercial plastics in the marketplace. To date, only two synthetic polymers from renewable feedstocks have exhibited potential to enter the commodity plastics market, polylactic acid (PLA) and poly-β-hydroxyalkanoate (PHA), which is a copolymer of the butanoate and the pentanoate.

Another commercialized polymer is polyglycolic acid (PGA). PGA displays a melting temperature, $T_m$, of 225-230° C. and glass transition temperature, $T_g$, of 35-40° C. PGA exhibits a high degree of crystallinity, 45-55%. The solubility of this polyester is somewhat unique. PGA in its high molecular weight form is insoluble and used in relatively small scale, primarily in the medical industry in the form of biodegradable sutures and implantable medical devices. PGA is sold under the trade name Kuredux® for packaging applications because of its excellent barrier properties (100 times better than polyethylene terephthalate). High molecular weight PGA is currently made by chain-growth ring opening polymerization (ROP) of the cyclic dimer, glycolide; however, difficulties persist in the efficient and cost-effective production of glycolide.

Polymers derived from biorenewable C1 feedstocks, in particular, methanol, are particularly interesting in the pursuit of biorenewable polymers. Methanol is commercially produced from methane in natural gas; however, methanol, wood alcohol, was originally synthesized from wood, and can be prepared from other renewable sources, including, agricultural wastes, ruminant emissions, landfill gas, and methane hydrates from the bottom of the ocean. A methanol economy has received serious consideration as a sustainable, bio-based successor to the fossil fuel economy. Polymers derived from this C1 feedstock can be economically viable before and after any demise of the fossil fuel economy.

PGA is an alternating copolymer of the C1 feedstocks carbon monoxide and formaldehyde. The gas phase thermodynamic calculations for the 1:1 incorporation of carbon monoxide and formaldehyde into a polyester indicates only nominally favorable energetics for this process ($\Delta G=-0.2$ kcal/mol at 298 K), and previous copolymerization studies yielded small molecule heterocycles or low molecular weight materials that were often poorly characterized. The copolymerization of formaldehyde, generally provided as paraformaldehyde or trioxane, and carbon monoxide has been disclosed. Cevidalli et al., U.S. Pat. No. 3,673,156, teaches copolymers prepared using a catalyst selected from the group of chlorinated and fluorinated cationic derivatives of group III, IV, V or VIII elements at −110° C. to 250° C., and 30 to 5,000 atmospheres (440 to 73,500 psi) to give copolymers having ester and acetal groups with significant portions of low molecular weight polymer formed. The ratio of the number of ester groups to the sum of the numbers of ester and acetal groups was claimed to range from 0.056 to 0.97 for these copolymers, although no examples exceeded 0.75. Drent et al., U.S. Pat. No. 6,376,723, teaches copolymers prepared using a catalyst selected from acidic compounds with pKa values below −1, and a sulfone solvent where the PGA is suitable as an intermediate for the preparation of ethylene glycol. The PGA is formed at 100 to 10000 kPa (14 to 1450 psi) and 20 to 170° C., although no examples are disclosed of temperatures for the polyaddition reaction in excess of 100° C. throughout the entire reaction. No yields of methylglycolate upon polymer degradation are reported that exceed 94%, with most results yielding much lower than 94%, implying that the proportion of ester groups was much less than 94% from the polymerization. Nelson et al., U.S. Pat. No. 3,383, 364 teaches copolymers prepared using a phosphoric acid, a non-protonating Lewis acid, or a free radical generator as catalyst with a reducing agent in solution at 5 to 50,000 psi and −50 to 250° C. to yield a polymer with 1 to 45 mole % CO units. The final polymer displays a "softening" point of 100° C., but no example of an acid catalyzed polymerization at temperatures in excess of 100° C. is disclosed. Modena et al., *Journal of Polymer Science Part B: Polymer Letters*, 1: 567-570 (1963) teaches the preparation of polymers from CO and formaldehyde using an undisclosed Lewis acid at an undisclosed temperature to yield a copolymer with $CO/H_2CO$ ratios of 1/3. Ragazzini et al. *Journal of Polymer Science Part A*, 2: 5203-12 (1964) teaches the preparation of polymers from CO and formaldehyde using boron trifluoride, as a Lewis acid, at 110° C. to form a copolymer with glycolic ester, diglycolic ester (—C(O)CH$_2$OCH$_2$C(O)—), and acetal units, which upon heating, to 180° C. with additional CO, results in the loss of acetal units but the retention of diglycolic ester units in a polymer having a melting temperature 80° C. below that of PGA. The polymer is soluble in DMF and DMSO.

The high $T_m$ and $T_g$ of PGA limit the highly crystalline polymer's use as a replacement for a commodity plastic. The brown or beige color displayed by PGA also diminishes its use in many packaging applications. To these ends, a PGA or PGA copolymer that is produced primarily from C1 feedstocks to a material with similar properties to PGA prepared by the ring-opening of glycolide or modified in a specifically desired manner to yield an equivalent to another commercial thermoplastic, is a desired goal.

BRIEF SUMMARY

An embodiment of the invention is directed to the preparation of a biorenewable polyglycolic acid (PGA) where carbon monoxide (CO) and a solution of formaldehyde or a formaldehyde equivalent, such as paraformaldehyde or trioxane, are mixed with a strong Brønsted acid to form a copolymer at a temperature in excess of 120° C. The copolymerization can be carried out at a pressure of 800 psi or greater. The strong Brønsted acid has a $pK_a$ of less than −1; for example, the acid can be trifluoromethane sulfonic acid (triflic acid) (TfOH). The solution can contain a solvent such as methylene chloride.

Another embodiment of the invention is directed to a method of preparing a biorenewable copolymer of PGA where the CO and formaldehyde, or a formaldehyde equivalent, are mixed with a cyclic ether, for example, an alkylene oxide, for copolymerization in the presence of a strong Brønsted acid. The copolymerization temperature can be equal to or greater than 100° C. and the Brønsted acid has a $pK_a$ of less than −1. The alkylene oxide can be, for example, ethylene oxide, propylene oxide, 1,2-butylene oxide, or 1,2-octylene oxide. Copolymers of PGA, according to an embodiment of the invention, have a plurality of a first repeating unit that are glycolic acid residues and a plurality of a second repeating unit that are derived from a cyclic ether, wherein the first repeating units are at least 95% of the repeating units.

DETAILED DISCLOSURE

Figure 1:
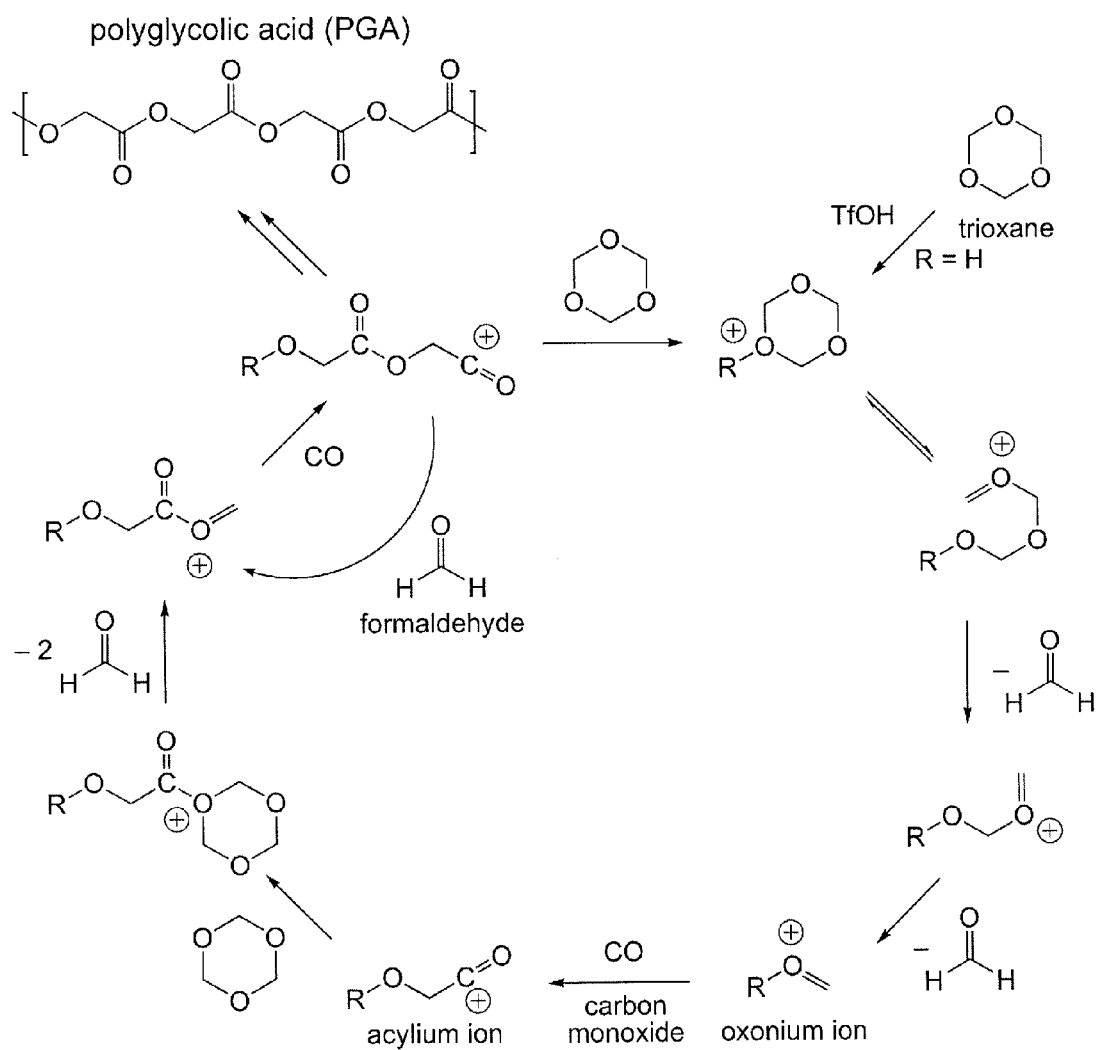
FIG. 1 shows a synthetic scheme for the preparation of polyglycolic acid (PGA) by a catalytic cycle for the alternating copolymerization of formaldehyde from trioxane and carbon monoxide under conditions where the depropagation of acetal units is rapid relative to addition of carbon monoxide, according to an embodiment of the invention.

Embodiments of the invention are directed to a method for the preparation of polyglycolic acid, PGA and copolymers thereof. The method allows the alternating copolymerization of carbon monoxide, CO, and formaldehyde, $H_2CO$, or its oligomerized equivalent, paraformadehyde or trioxane, to a homopolymeric PGA, or to a copolymer formed by the terpolymerization of CO, $H_2CO$ and an epoxide compound. The method provides a high molecular weight homopolymeric PGA sufficiently free of acetal units to provide a polymer with $T_m$ and $T_g$ values greater than 190° C. and 10° C., respectively, which can be used as the equivalent of PGA prepared by the ring-opening polymerization of glycolide. The polymerization is carried out in an inert solvent using a strong Brønsted acid, for example, trifluoromethane sulfonic acid (triflic acid) (TfOH), at moderate CO pressures and temperatures of 120° C. or greater, for example, 150° C. or greater or 170° C. or greater, with high CO to $H_2CO$ ratios in the reactor to prepare polymers with a very high conversion of formaldehyde. The polymerization is illustrated in FIG. 1, where the anticipated oxonium and acylium ion intermediates are alternating chain ends of the growing alternating copolymer, and either trioxane adds, with loss of two equivalents of formaldehyde, or formaldehyde adds alternately with carbon monoxide.

Figure 2:
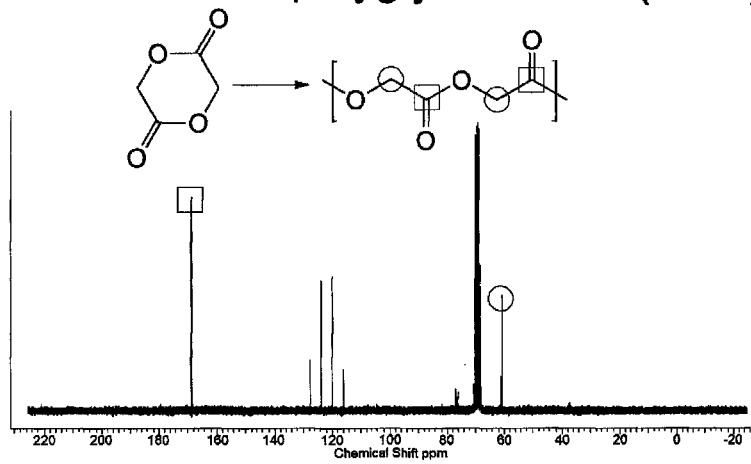
FIG. 2 shows $^{13}$C NMR spectra of (a) commercial PGA and (b) PGA made from formaldehyde and carbon monoxide (Table 1, entry 1.10) according to an embodiment of the invention.
Figure 2:
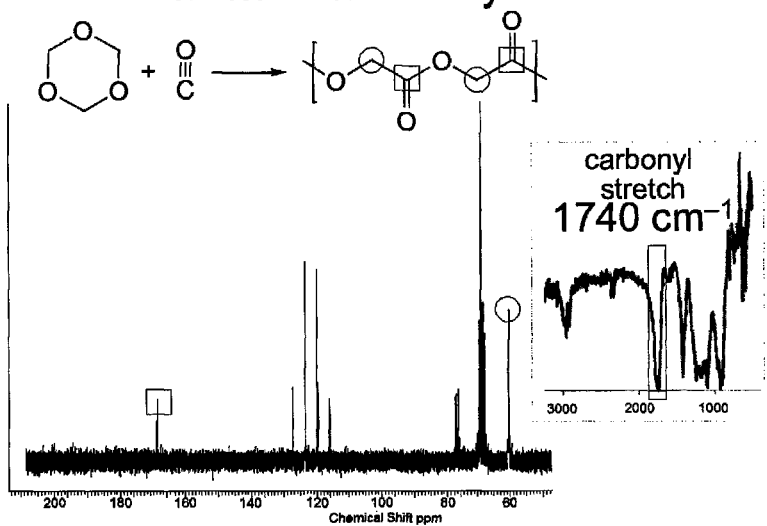

Surprisingly, it has been discovered that carrying out the conversion at a temperature of 100° C. or more, for example, 110° C., 120° C., 150° C. or more, appears to be critical to achieving a polymer with very little or no acetal units. Not to be bound by a mechanism, it appears that by exceeding the ceiling temperature for the preparation of polyoxymethylene, the depropagation of acetal repeating units in the growing copolymer is fast relative to addition of CO to the propagating acetal sequence. In this manner, the proportion of acetal groups in the resulting polymer is very low, generally not readily observable, and the polymer from CO and $H_2CO$ is sufficiently similar to that prepared from glycolide that it can be readily substituted for the PGA prepared from glycolide. The equivalence of the polymer prepared from CO and $H_2CO$ and that from glycolide is shown in FIG. 2, where nearly identical $^{13}$C NMR spectra, free of acetal carbon signals, are observed for commercial PGA and the PGA from the C1 feedstocks. FIG. 2 also shows a portion of the IR spectrum of the PGA, prepared according to an embodiment of the invention, which displays the ester carbonyl stretch at 1740 cm$^{-1}$ that is indicative of PGA. The polymerization is initiated by Brønsted acids, where very strong acids, such as trifluoromethane sulfonic acid (TfOH), are preferred. Table 1, below, indicates that the reaction behavior is very sensitive to the reaction conditions. Employing 800 psi of carbon monoxide, polymerization temperatures from room temperature (RT) to 170° C. were investigated using $BF_3.OEt_2$, presumably with traces of water, para-toluenesulfonic acid (PTSA), or TfOH. As can be seen in Table 1, higher yields are obtained at higher temperatures, with the highest yield obtained at 170° C., and with better yields achieved with TfOH than with other acids. The polymer of Table 1, entry 1.6, is sufficiently soluble in THF to permit characterization of the molecular weight by Gel Permeation Chromatography (GPC), where $M_w$=94,600, $M_n$=64,800, polydispersity index (PDI)=1.46, but all other polymers in Table 1 are insoluble in all tested solvents, except for hexafluoroisopropanol, which dissolves commercially available PGA.

TABLE 1

Data for copolymerization of formaldehyde (trioxane) and carbon monoxide.[a]

| entry | CO (psi) | Initiator 1 mol % | temp (° C.) | time (h) | yield (g) | yield (%) | $T_g$ (° C.) | $T_m$ (° C.) |
|---|---|---|---|---|---|---|---|---|
| 1.1 | 250 | $BF_3 \cdot OEt_2$ | RT | 24 | 4.8 | 27 | — | — |
| 1.2 | 480 | $BF_3 \cdot OEt_2$ | RT | 24 | 7.0 | 40 | — | — |
| 1.3 | 800 | $BF_3 \cdot OEt_2$ | 100 | 24 | 0.0 | 0 | — | — |
| 1.4 | 800 | TfOH | 50 | 24 | 4.1 | 24 | — | — |
| 1.5 | 800 | TfOH | 80 | 24 | 2.6 | 15 | — | — |
| 1.6[b] | 800 | TfOH | 105 | 24 | 2.5 | 14 | — | — |
| 1.7 | 800 | TfOH | 120 | 48 | 6.7 | 39 | −18 | 143 |
| 1.8 | 800 | TfOH | 130 | 72 | 11.0 | 63 | 21 | 163 |
| 1.9 | 800 | TfOH | 150 | 72 | 14.4 | 83 | −2 | 180 |
| 1.10 | 800 | TfOH | 170 | 72 | 16.0 | 92 | 17 | 195 |
| 1.11[c] | 800 | TfOH | 100 | 24 | 3.5 | 20 | — | — |
| 1.12 | 800 | PTSA | 120 | 48 | 5.5 | 31 | — | — |

[a]Reactions conducted with 9.03 g of trioxane and dichloromethane as solvent unless otherwise noted.
[b]By GPC (in THF) entry 1.6 gave $M_w$ = 94,600, $M_n$ = 64,800, polydispersity index (PDI) = 1.46.
[c]Polymerization solvent heptane.

As indicated in Table 1, the inert solvent can be, for example, dichloromethane or even a hydrocarbon. Other solvents that can be used include, but are not limited to: dichloroethane; tetrachloroethane; chlorobenzene; dichlorobenzene; trichlorobenzene; and heptane. According to an embodiment of the invention, where the temperature of polymerization is above 150° C., the properties of the PGA are excellent, with $T_g$ and $T_m$ values that are similar to that of commercially available PGA, for example, $T_m$ above about 180° C. As is common to commercially available PGA samples, PGA prepared in accordance to embodiments of the invention is dark in color.

According to an embodiment of the invention, to improve on the thermal properties of PGA with respect to processing temperature and color and make the resulting polymer better suited as a substitute for traditional commodity thermoplastics, terpolymerization of CO, $H_2CO$, and other monomers is performed. According to an embodiment of the invention, the terpolymerization of CO, $H_2CO$, and one or more cyclic ethers is carried out using an acid catalyst. In embodiments of the invention, the terpolymers can be the product of CO, $H_2CO$, and an alkylene oxide, for example, ethylene oxide, propylene oxide, butylene oxide, or octylene oxide. Equations for the some terpolymerizations, according to an embodiment of the invention, are included in FIG. 3. For example, in an embodiment of the invention, using a trioxane: propylene oxide feed ratio of 95:5 with CO, a 2% incorporation of the epoxide was obtained, as indicated by $^1H$ NMR of the resulting polyester/ether. The inclusion of the non-acetal ether permits a fine-tuning of the terpolymer's melting temperature and other associated thermomechanical properties, such as, modulus, tensile strength, brittleness, and impact strength. FIG. 4 is a mechanistic scheme consistent with the incorporation of the epoxy group into the main-chain of the terpolymer through a ring-opening attack of an intermediate oxonium ion of the epoxide.

In contrast to PGA synthesis, the optimal terpolymerization temperatures of polymerization are lower than that for PGA preparation; for example, 100° C. allowed the isolation of low color terpolymers. Nearly all terpolymers, except those that yield an undesirable black solid experimentally, are soluble in hexafluoroisopropanol. When the reaction temperature increases, the CO incorporation and polymer melting temperature increase, as in the PGA synthesis, and the color becomes darker. The color and melting point change indicate that the carbon monoxide incorporation increases with increasing temperature. However, the addition of small amounts of the ter-monomer, for example, propylene oxide, results in a decrease of the polymer melting temperature, and the color of the terpolymer became less intense than that of commercial PGA. A terpolymer, prepared as indicated in Table 2 entry 2.6, below, displayed a glass transition temperature and melting temperature of −5 and 166° C., respectively, which are similar thermal transition temperatures with isotactic polypropylene, indicating the terpolymers of the invention may be employed as direct substitutes for traditional thermoplastics. Experiments to optimize the CO pressure displayed no discernible effect on the terpolymer yield. In addition to TfOH and other strong Brønsted acid having a $pK_a$ of less than −1, Lewis acids, for example, $BF_3.OEt_2$ can be used.

Materials and Methods

Solvents were purified by stirring over calcium hydride for 24 hours followed by vacuum transfer into an oven dried Straus flask. Xylenes were purchased from Sigma Aldrich and stored over molecular sieves. Solvents were purchased from Sigma Aldrich and used as received. The catalyst, para-toluenesulfonic acid (p-TSA), $BF_3.OEt_2$, triflic acid (TfOH) were purchased from Sigma Aldrich and used as received. Polymerizations were carried out using a Parr high pressure autoclave.

Nuclear magnetic resonance spectra were recorded using an Inova 500 MHz spectrometer. NMR samples were prepared in the following manner: 0.5 g of the polymer sample was dissolved in 0.4 g of hexafluoroisopropanol (HFIP) and 1.0 g of $CDCl_3$ was added into the mixture. $^1H$ NMR spectroscopy was performed with 32 scans, and 5 s relaxation delay. $^{13}C$ NMR spectroscopy was performed with 10,000 scans, and 3 s relaxation delay. Chemical shifts are reported in parts per million (ppm) downfield relative to tetramethylsilane (TMS, 0.0 ppm) or residual proton in the specified solvent.

Differential scanning calorimetry thermograms were obtained with a DSC Q1000 from TA instruments. About 1.5-3 mg of each sample were added to a sealed pan that passed through a heat/cool/heat cycle at 10° C./min.

Thermogravimetric analyses were measured under nitrogen with a TGA Q5000 from TA Instruments. For each sample, about 5-10 mg was heated at 10° C./min from RT to 500° C.

Fourier transform infrared (FTIR) spectra were recorded on a Perkin Elmer model Spectrum one FT-IR spectrometer. FTIR scans were collected on ZnSe plate.

Gel permeation chromatography (GPC) was performed at 40° C. using a Waters Associates GPCV2000 liquid chromatography system with an internal differential refractive index detector and two Waters Styragel HR-5E columns (10 μm PD, 7.8 mm i.d., 300 mm length) using HPLC grade tetrahydrofuran (THF) as the mobile phase at a flow rate of 1.0 mL/min. Calibration was performed with narrow polydispersity polystyrene standards.

General Polymerization Procedure

Figure 3:
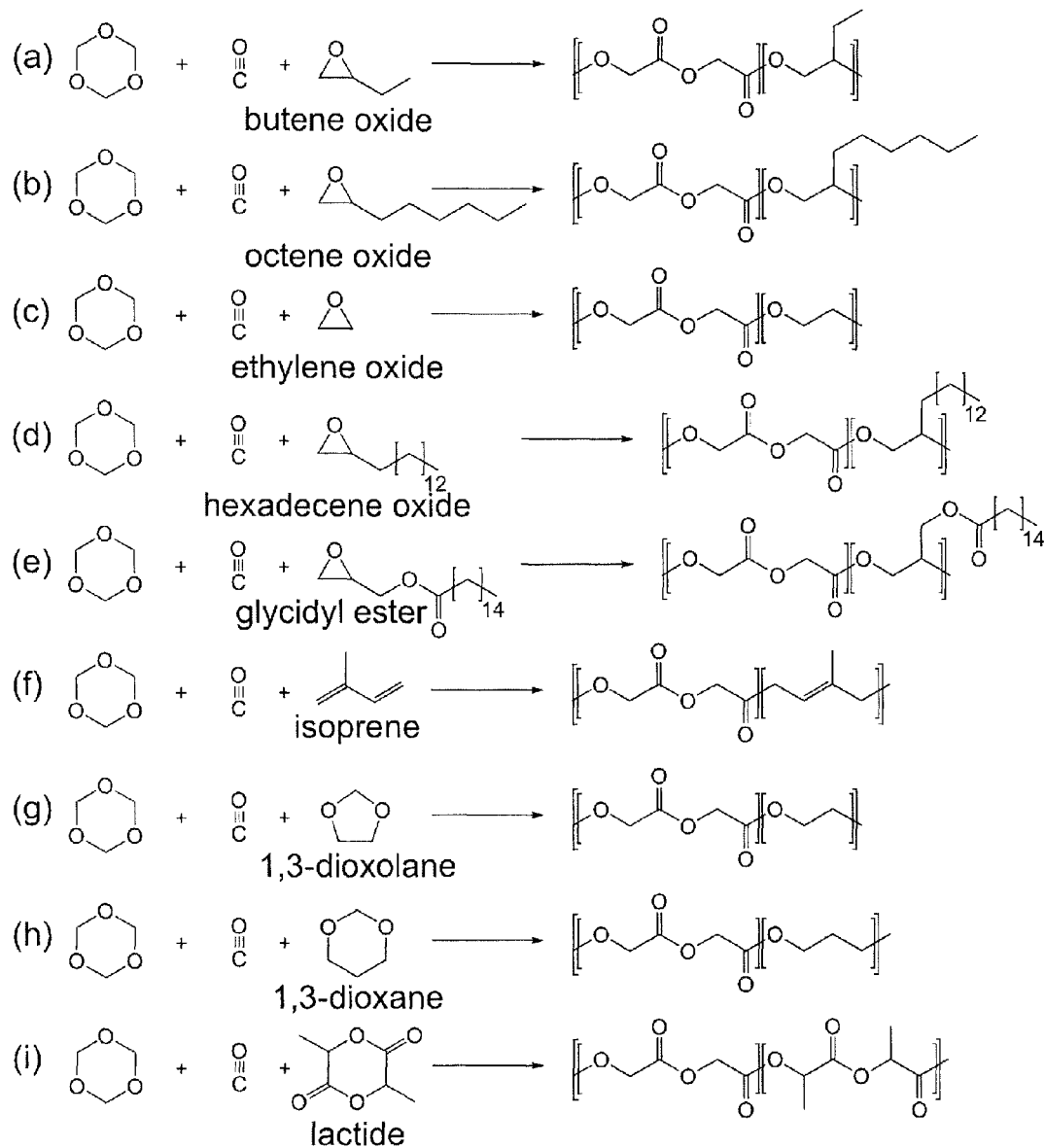
FIG. 3 shows reaction equations for various terpolymerizations, according to an embodiment of the invention, where the monomer feed comprises trioxane (as a formaldehyde equivalent), carbon monoxide, and a cyclic ether.
Figure 4:
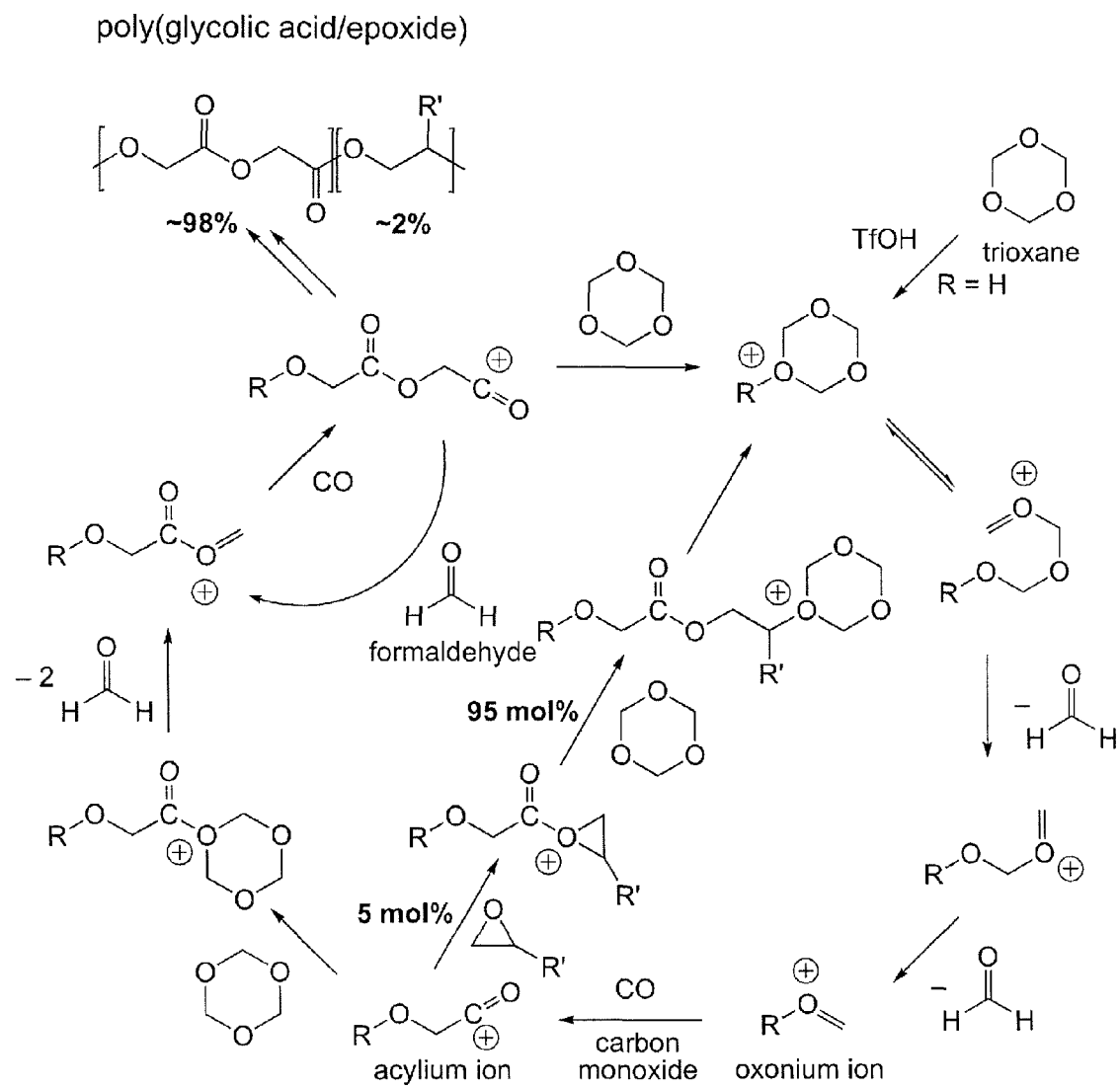
FIG. 4 shows a synthetic scheme for the preparation of copolymers of polyglycolic acid (PGA) by a catalytic cycle for the alternating copolymerization of formaldehyde from trioxane and carbon monoxide under conditions where the depropagation of acetal units is rapid relative to addition of carbon monoxide, and where a cyclic ether, shown as an alkylene oxide is randomly copolymerized with the glycolic acid derived repeating units, according to an embodiment of the invention.

Under a nitrogen atmosphere, a mixture of trioxane, comonomer, selected from those shown in FIG. 3, and an acid catalyst (1 mmol) in 100 mL of a solvent was placed in a 600-mL high pressure reactor. The reactor was charged with CO, and heated to a desired polymerization temperature. The reactor was stirred under pressure for a desired reaction time at a constant temperature. After cooling to room temperature, the pressure was released, and the polymerization solution was poured into cold basic methanol. The precipitated product was washed with methanol and with DCM. The washed solid was dried under vacuum.

Figure 5:
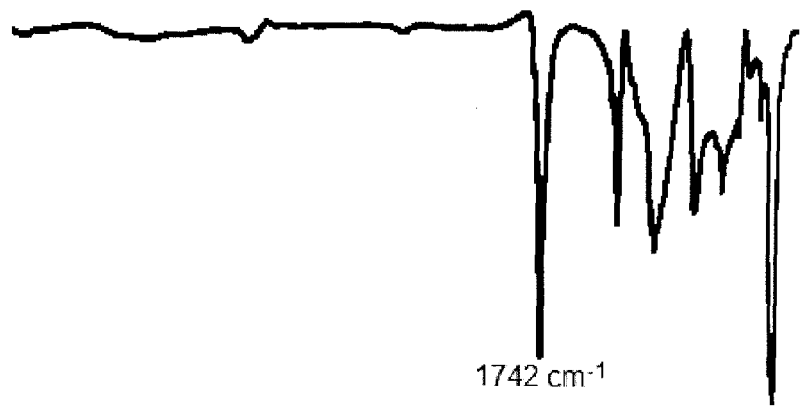
FIG. 5 shows a trace of a FTIR spectrum of the terpolymer of entry 2.6 of Table 2, according to an embodiment of the invention, where the ester carbonyl is labeled by the wave number 1742 cm$^{-1}$.
Figure 6:
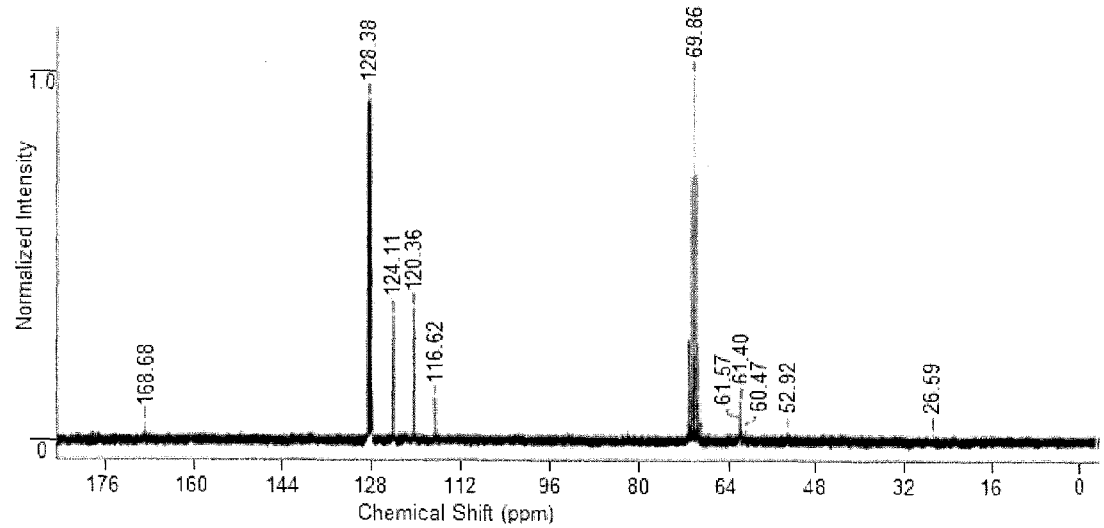
FIG. 6 shows a $^{13}$C NMR spectrum of the terpolymer of entry 2.6 of Table 2, according to an embodiment of the invention.

Table 2, below, contains terpolymerization data for terpolymerizations with propylene oxide. In contrast to copolymerization of trioxane and carbon monoxide without an epoxy termonomer, optimal polymerization temperatures are lower than for the copolymerization of $H_2CO$ and CO. Lower temperatures were advantageous, with high yields achieved at 120° C., as indicated in Table 2, entries 2.8, 2.9, 2.11-18. At high temperatures, 150° C. or greater, yields are poor for terpolymerizations and results in materials that are black and intractable (Table 2, entries 2.1-3). At 120° C., lower yields were obtained for CO pressures of 700 psi or 1000 psi (Table 2, entries 2.13 and 2.14), than when the CO pressure was 800 psi. Polymerization yields for trioxane/propylene oxide feed ratios less than 95/5 are inferior to those where feed ratios are 95/5 or more, to the extent that no polymer forms at trioxane/propylene oxide ratios of 70/30 (Table 2, entry 2.12). The terpolymer's melting temperature is diminished significantly with only a small incorporation of propylene oxide, where the maximum observed $T_m$ is 184° C. However, the color of the terpolymers is considerably lower than that of commercial PGA with the addition of only 1% epoxy in the trioxane-propylene oxide mixture. The terpolymer of Table 2 entry 2.6 has thermal transition temperatures similar to isotactic polypropylene. FIG. 5 is a FTIR spectrum of the terpolymer of entry 2.6, clearly displaying the ester carbonyl. FIG. 6 is a $^{13}C$ NMR spectrum of the terpolymer of entry 2.6, which clearly indicates the incorporation of the termonomer.

TABLE 2

Terpolymerization of formaldehyde (trioxane), carbon monoxide, and propylene oxide.[a]

| Entry | CO (psi) | trioxane/ epoxide | temp (° C.) | yield (g) | yield (%) | color | $T_g$ (° C.) | $T_m$ (° C.) |
|---|---|---|---|---|---|---|---|---|
| 2.1 | 800 | 95/5 | 150 | 0.3 | 2 | black | | |
| 2.2 | 800 | 90/10 | 150 | 0.3 | 2 | black | | |
| 2.3 | 800 | 80/20 | 150 | 0.4 | 2 | black | | |
| 2.4 | 800 | 95/5 | 100 | 10.5 | 63 | off-white | 5 | 162 |
| 2.5 | 800 | 90/10 | 100 | 2.7 | 16 | off-white | | |
| 2.6 | 800 | 95/5 | 110 | 10.8 | 64 | off-white | −5 | 166 |
| 2.7 | 800 | 90/10 | 110 | 6.6 | 39 | off-white | 2 | 175 |
| 2.8 | 800 | 95/5 | 120 | 12.9 | 77 | off-white | 8 | 180 |
| 2.9 | 800 | 90/10 | 120 | 5.1 | 30 | off-white | n.o. | 184 |
| 2.10 | 800 | 95/5 | 130 | 8.6 | 51 | light brown | 12 | 175 |
| 2.11 | 800 | 80/20 | 120 | 0.2 | 1 | brown | | |
| 2.12 | 800 | 70/30 | 120 | 0.0 | no react. | | | |
| 2.13 | 700 | 95/5 | 120 | 9.8 | 58 | light brown | 1 | 169 |
| 2.14 | 1000 | 95/5 | 120 | 10.5 | 61 | light brown | 7 | 168 |
| 2.15 | 800 | 96/4 | 120 | 8.7 | 52 | light brown | 23 | 178 |
| 2.16 | 800 | 97/3 | 120 | 12.6 | 75 | light brown | 26 | 183 |
| 2.17 | 800 | 98/2 | 120 | 13.1 | 80 | light brown | 19 | 179 |
| 2.18 | 800 | 99/1 | 120 | 9.2 | 55 | off-white | 19 | 169 |
| | | PGA | | | | | 46 | 215 |

[a]Reactions conducted with (9.03)•(mole % trioxane) g of trioxane, 1 mol % TfOH as initiator, dichloromethane as solvent, and a reaction time of 72 hours.

Other monomers for inclusion in terpolymerizations with CO and $H_2CO$ or its equivalent are shown in FIG. 3. These monomers include 1,3-dioxolane, 1,3 dioxane, lactides, and isoprene. Results of terpolymerizations employing various ter-monomers with trioxane and CO follow.

Terpolymerization of trioxane, butylene oxide and carbon monoxide

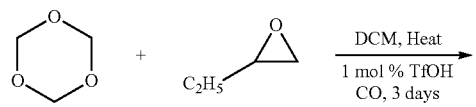

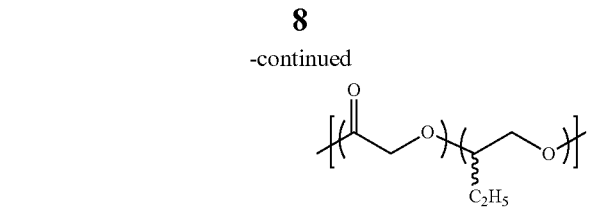

TABLE 3

Terpolymerization of trioxane, butylene oxide and CO[a]

| Entry | Trioxane/ Butylene oxide % | $T_p$ (° C.) | Yield (g)/ Color | Yield (%) | $T_g$ (° C.) | $T_m$ (° C.) |
|---|---|---|---|---|---|---|
| 3.1 | 95/5 | 90 | 3.5/white | 21 | 19 | 155 |
| 3.2 | 95/5 | 100 | 9.2/off white | 54 | 8 | 170 |
| 3.3 | 95/5 | 110 | 8.5/off white | 50 | 16 | 176 |
| 3.4 | 95/5 | 120 | 5.8/light brown | 34 | 2 | 180 |

[a]Reactions conducted with (9.03)•(mole % trioxane) g of trioxane, 1 mol % TfOH as initiator, dichloromethane as solvent, 800 psi CO pressure, and a reaction time of 72 hours.

Terpolymerization of trioxane, 1,2-hexene oxide and carbon monoxide

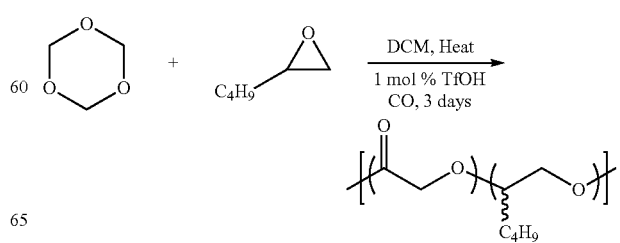

TABLE 4

Terpolymerization of trioxane, epoxyhexane and CO[a]

| Entry | Trioxane/ Epoxyhexane % | $T_p$ (° C.) | Yield (g)/ Color | Yield (%) | $T_g$ (° C.) | $T_m$ (° C.) |
|---|---|---|---|---|---|---|
| 4.1 | 95/5 | 100 | 6.2/off white | 36 | 2 | 170 |
| 4.2 | 95/5 | 110 | 9.0/light brown | 53 | −14 | 178 |
| 4.3 | 95/5 | 120 | 2.9/light brown | 17 | | |

[a]Reactions conducted with (9.03)•(mole % trioxane) g of trioxane, 1 mol % TfOH as initiator, dichloromethane as solvent, 800 psi CO pressure, and a reaction time of 72 hours.

Terpolymerization of trioxane, cyclohexene oxide and carbon monoxide

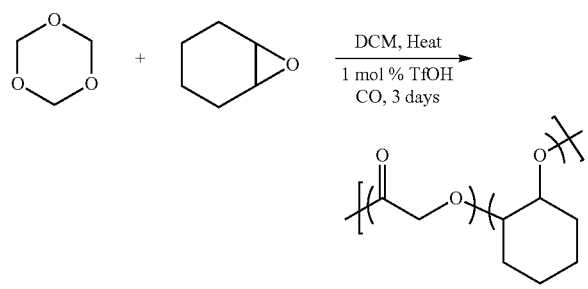

TABLE 5

Terpolymerization of trioxane, cyclohexene oxide and CO[a]

| Entry | Trioxane/ Cyclohexene oxide % | $T_p$ (° C.) | Yield (g)/ Color | Yield (%) | $T_g$ (° C.) | $T_m$ (° C.) |
|---|---|---|---|---|---|---|
| 5.1 | 95/5 | 100 | 10.7/light brown | 63 | −12 | 170 |
| 5.2 | 95/5 | 110 | 11.8/light brown | 69 | 32 | 182 |
| 5.3 | 95/5 | 120 | 11.2/light brown | 66 | 6 | 195 |

[a]Reactions conducted with (9.03)•(mole % trioxane) g of trioxane, 1 mol % TfOH as initiator, dichloromethane as solvent, 800 psi CO pressure, and a reaction time of 72 hours.

Terpolymerization of trioxane, 1,2-octene oxide and carbonmonoxide[a].

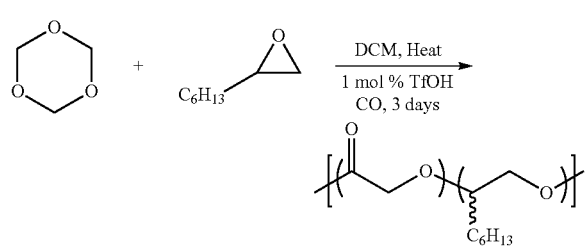

TABLE 6

Terpolymerization of trioxane, epoxyoctane and CO[a]

| Entry | Trioxane/ Epoxyoctane % | $T_p$ (° C.) | Yield (g)/ Color | Yield (%) | $T_g$ (° C.) | $T_m$ (° C.) |
|---|---|---|---|---|---|---|
| 6.1 | 95/5 | 100 | 8.4/off white | 49 | 18 | 168 |
| 6.2 | 95/5 | 110 | 9.8/light brown | 57 | 13 | 176 |
| 6.3 | 95/5 | 120 | 9.6/light brown | 56 | | |

[a]Reactions conducted with (9.03)•(mole % trioxane) g of trioxane, 1 mol % TfOH as initiator, dichloromethane as solvent, 800 psi CO pressure, and a reaction time of 72 hours.

Terpolymerization of trioxane, dioxolane and carbon monoxide

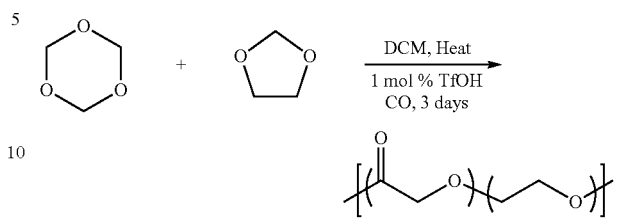

TABLE 7

Terpolymerization of trioxane, dioxolane and CO[a]

| Entry | Trioxane/ Dioxolane % | $T_p$ (° C.) | Yield (g)/ Color | Yield (%) | $T_g$ (° C.) | $T_m$ (° C.) |
|---|---|---|---|---|---|---|
| 7.1 | 95/5 | 100 | 12.4/off white | 73 | 14 | 174 |
| 7.2 | 95/5 | 110 | 12.8/off white | 76 | 16 | 180 |
| 7.3 | 95/5 | 120 | 14.2/off white | 84 | 14 | 189 |
| 7.4 | 95/5 | 130 | 11.5/light brown | 68 | 32 | 192 |
| 7.5 | 95/5 | 140 | 7.7/light brown | 45 | 18 | 194 |
| 7.6 | 90/10 | 120 | 7.8/off white | 47 | 16 | 180 |
| 7.7 | 80/20 | 120 | no reaction | | | |

[a]Reactions conducted with (9.03)•(mole % trioxane) g of trioxane, 1 mol % TfOH as initiator, dichloromethane as solvent, 800 psi CO pressure, and a reaction time of 72 hours.

Terpolymerization of trioxane, 1,4-dioxane and carbon monoxide

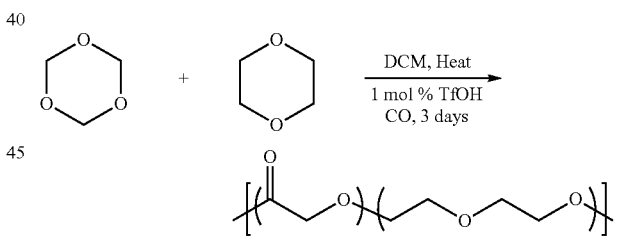

TABLE 8

Terpolymerization of trioxane, 1,4-dioxane and CO[a]

| Entry | Trioxane/ 1,4-dioxane % | $T_p$ (° C.) | Yield (g)/ Color | Yield (%) | $T_g$ (° C.) | $T_m$ (° C.) |
|---|---|---|---|---|---|---|
| 8.1 | 95/5 | 110 | 2.8/off white | 16 | 5 | 160 |
| 8.2 | 95/5 | 120 | 12.1/off white | 70 | 25 | 177 |
| 8.3 | 95/5 | 130 | 13.3/light brown | 77 | — | 189 |
| 8.4 | 95/5 | 140 | 15.8/light brown | 92 | — | 197 |
| 8.5 | 95/5 | 150 | 12.5/light brown | 73 | | |
| 8.6 | 90/10 | 140 | 11.2/light brown | 65 | | |
| 8.7 | 80/20 | 140 | 3.5/light brown | 20 | | |

[a]Reactions conducted with (9.03)•(mole % trioxane) g of trioxane, 1 mol % TfOH as initiator, dichloromethane as solvent, 800 psi CO pressure, and a reaction time of 72 hours.

Terpolymerization of trioxane, THF and carbon monoxide

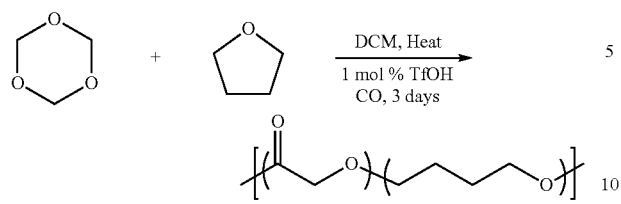

TABLE 9

Terpolymerization of trioxane, THF and CO[a]

| Entry | Trioxane/ THF % | $T_p$ (° C.) | CO (psi) | Yield (g)/Color | Yield (%) |
|---|---|---|---|---|---|
| 9.1 | 95/5 | 170 | 800 | 4.0/light brown | 24 |
| 9.2 | 95/5 | 150 | 800 | 3.4/off white | 20 |
| 9.3 | 95/5 | 190 | 800 | 1.4/black | 8 |
| 9.4 | 95/5 | 170 | 1000 | 3.8/brown | 22 |
| 9.5 | 95/5 | 170 | 1200 | 6.3/brown | 37 |
| 9.6 | 90/10 | 170 | 1200 | 5.6/light brown | 34 |
| 9.7 | 80/20 | 170 | 1200 | 5.0/light brown | 32 |
| 9.8 | 70/30 | 170 | 1200 | 3.7/brown | 26 |
| 9.9 | 60/40 | 170 | 1200 | No reaction | 0 |

[a]Reactions conducted with (9.03) · (mole % trioxane) g of trioxane, 1 mol % TfOH as initiator, dichloromethane as solvent, 800 psi CO pressure, and a reaction time of 72 hours.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method of preparing a biorenewable polyglycolic acid (PGA) comprising:
   providing a pressure of carbon monoxide (CO);
   providing a solution of formaldehyde or a formaldehyde equivalent;
   mixing the solution with a strong Brønsted acid; and
   copolymerizing the CO and the formaldehyde or formaldehyde equivalent at a temperature in excess of 170° C., wherein the Brønsted acid has a $pK_a$ of less than −1, wherein the PGA has no readily observable acetal units.

2. The method of claim 1, wherein the formaldehyde equivalent is paraformaldehyde or trioxane.

3. The method of claim 1, wherein copolymerizing occurs at a pressure of 800 psi or greater.

4. The method of claim 1, wherein the strong Brønsted acid is trifluoromethane sulfonic acid (triflic acid) (TfOH).

5. The method of claim 1, wherein the solvent for the solution is methylene chloride.

6. A method of preparing a biorenewable copolymer of PGA comprising:
   providing a pressure of carbon monoxide (CO);
   providing a solution of formaldehyde or a formaldehyde equivalent and a cyclic ether;
   mixing the solution with a strong Brønsted acid or a Lewis acid; and
   polymerizing the formaldehyde or formaldehyde equivalent and the cyclic ether with the CO at a temperature equal to or greater than 100° C., wherein the Brønsted acid has a $pK_a$ of less than −1, to form a copolyester-ether.

7. The method of claim 6, wherein the cyclic ether is an alkylene oxide.

8. The method of claim 7, wherein the alkylene oxide is ethylene oxide, propylene oxide, 1,2-butylene oxide, 1,2-octylene oxide, cyclohexene oxide, or 1,2-hexene oxide.

9. A copolymer of PGA, comprising: a copolyester-ether having a plurality of a first repeating unit that are glycolic acid residues; and a plurality of a second repeating unit derived from a cyclic ether randomly incorporated into the copolyester-ether, wherein the first repeating unit comprises at least 95% of the repeating units.

10. The copolymer of claim 9, wherein the cyclic ether is dioxolane, 1,4-dioxane, or tetrahydrofuran.

11. A method of preparing a biorenewable polyglycolic acid (PGA) comprising:
    providing a pressure of carbon monoxide (CO);
    providing a solution of formaldehyde or a formaldehyde equivalent in methylene chloride, dichloroethane, tetrachloroethane, chlorobenzene, dichlorobenzene, trichlorobenzene, or heptane;
    mixing the solution with a strong Brønsted acid; and
    copolymerizing the CO and the formaldehyde or formaldehyde equivalent at a temperature in excess of 100° C., wherein the Brønsted acid has a $pK_a$ of less than −1, wherein the PGA has no readily observable acetal units.

12. The method of claim 11, wherein the formaldehyde equivalent is paraformaldehyde or trioxane.

13. The method of claim 11, wherein copolymerizing occurs at a pressure of 800 psi or greater.

14. The method of claim 11, wherein the strong Brønsted acid is trifluoromethane sulfonic acid (triflic acid) (TfOH).

15. The method of claim 6, wherein the cyclic ether is 1,3-dioxolane, 1,4-dioxane, or tetrahydrofuran.

* * * * *